United States Patent [19]

Vidovic

[11] 3,816,658

[45] June 11, 1974

[54] APPARATUS FOR PROVIDING SYNC PULSES ON A SINGLE CONDUCTOR TO A PLURALITY OF TELEVISION CAMERAS

[75] Inventor: Nikola V. Vidovic, Sunnyvale, Calif.

[73] Assignee: The Singer Company, Binghamton, N.Y.

[22] Filed: Oct. 31, 1972

[21] Appl. No.: 302,531

Related U.S. Application Data

[63] Continuation-in-part of Ser. No. 148,731, June 1, 1971.

[52] U.S. Cl. .......................................... 178/69.5 TV

[51] Int. Cl. .............................................. H04l 7/00

[58] Field of Search...178/69.5 TV, 69.5 GE, 69.5 DC; 179/15 BS; 325/38 A, 58; 340/347

[56] References Cited

UNITED STATES PATENTS

| | | | |
|---|---|---|---|
| 3,588,351 | 6/1971 | Baun | 178/69.5 TV |
| 3,671,669 | 6/1972 | Abbott | 178/69.5 TV |
| 3,678,199 | 9/1972 | Brown | 178/69.5 TV |

*Primary Examiner*—Albert J. Mayer
*Attorney, Agent, or Firm*—James C. Kesterson; Leonard Weiss

[57] ABSTRACT

Horizontal and vertical sync pulses synchronized to a central sync generator are provided to a plurality of TV cameras through respective single cables. In response to horizontal and vertical sync pulses provided by the sync generator, an encoder circuit provides encoded pulses on one end of the cables. A plurality of decoder circuits respectively connected to each of the other ends decodes the encoded pulses and provides the synchronized horizontal and vertical sync pulses to the cameras. In the absence of the encoded pulses, unsynchronized sync pulses are automatically provided by the decoder circuits.

4 Claims, 4 Drawing Figures

APPARATUS FOR PROVIDING SYNC PULSES ON A SINGLE CONDUCTOR TO A PLURALITY OF TELEVISION CAMERAS

This is a continuation-in-part of the application having Ser. No. 148,731 filed on June 1, 1971.

BACKGROUND OF THE INVENTION

1. Field of the Invention

This invention relates to the utilization of a single cable for the simultaneous transmission of a plurality of pulse trains and more particularly to the encoding and transmission of a pair of pulse trains through a single cable to apparatus for disjunctively providing the pulse trains.

2. Description of the Prior Art

In the operation of a television camera a pair of pulse trains are usually provided wherein one pulse train consists of horizontal sync pulses and the other consists of vertical sync pulses. In a television studio where a plurality of cameras may be used, each camera's horizontal and vertical sync pulses are typically provided by a common sync generator. Vertical and horizontal sync pulses are transmitted from the generator to each camera through a pair of cables. All of the cables are usually of the same length whereby the pulses have a substantially equal transit time from the generator to each of the cameras.

The provision of a pair of cables for each camera greatly multiplies the number of cables used in a studio thereby increasing the probability of a cable disconnection and greatly adding to the bulk of equipment in the studio.

SUMMARY OF THE INVENTION

An object of the present invention is to provide to a plurality of TV cameras horizontal and vertical sync pulses synchronized to a central sync generator.

Another object of the present invention is to provide horizontal and vertical sync pulses synchronized to a central sync generator to a plurality of TV cameras where the number of cables is minimized between the cameras and the generator.

A further object of the present invention is to provide horizontal and vertical sync pulses to a TV camera in the absence of sync pulses from a central sync generator.

According to the present invention, an encoder circuit provides encoded signal pulses representative of applied first and second signal pulses; a pair of signal pulses synchronized to said first and second pulses are disjunctively provided by a decoder circuit in response to the application of said encoded signal pulses.

In further accord with the present invention, a pair of unsynchronized signal pulses are provided by said decoder circuit in the absence of said encoded signal pulses.

Apparatus in accordance with the present invention provides for the transmission of horizontal and vertical sync pulses synchronized with a central sync pulse generator to a plurality of TV cameras respectively through a plurality of single cables. In the absence of the synchronized pulses, unsynchronized horizontal and vertical sync pulses are provided to the camera.

Other objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
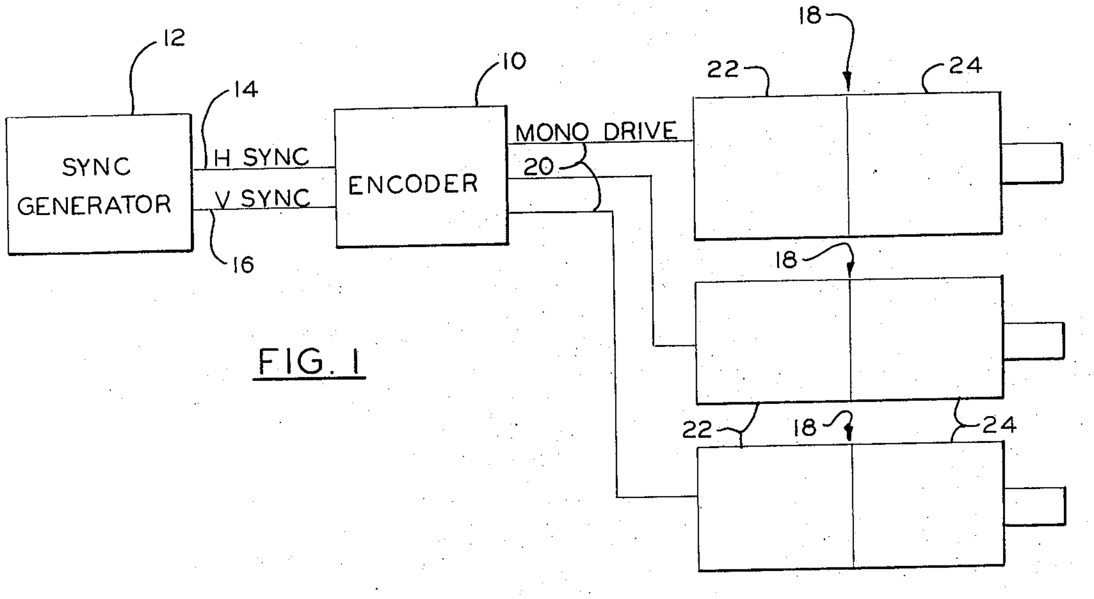
FIG. 1 is a block diagram of the preferred embodiment of the present invention.

Referring now to FIG. 1, an encoder circuit 10 receives horizontal and vertical sync signal pulses from a central sync generator 12 through signal lines 14, 16. The horizontal and vertical sync pulses are typically provided at 15.75 KHz and 60 Hz rates, respectively. In response to the sync pulses (monodrive signals are discussed in more detail hereinafter), the encoder 10 provides monodrive signal pulses to a plurality of TV camera assemblies 18 through signal lines 20. Only one of the lines 20 is connected from each of the assemblies 18 to the encoder 10. Each of the assemblies 18 is comprised of a decoder circuit 22 which responds to monodrive pulses by providing to a camera 24 horizontal and vertical sync pulses synchronized to the sync generator 12. When monodrive pulses are not received by an assembly 18, the decoder 22 automatically provides unsynchronized horizontal and vertical sync pulses.

Figure 2:
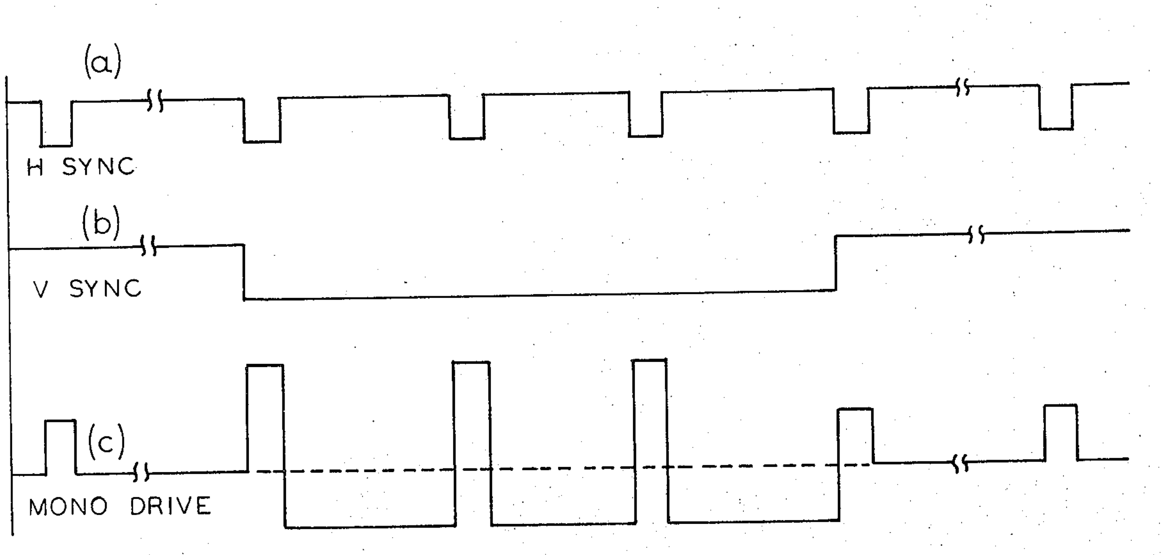
FIG. 2 is a timing diagram of the horizontal sync pulses, the vertical sync pulses and the monodrive pulses all on a common time base.
Figure 3:
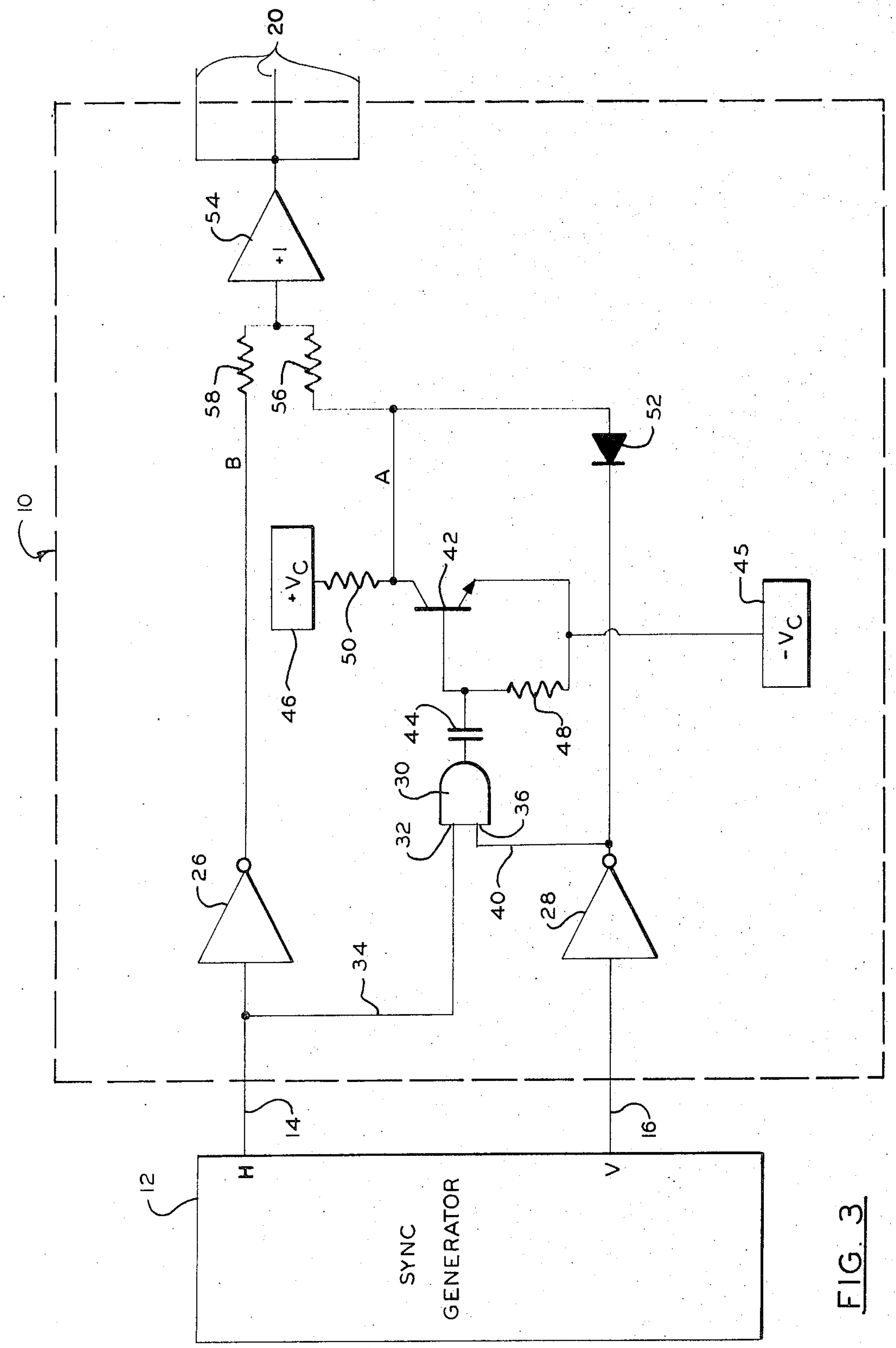
FIG. 3 is a schematic diagram of an encoder circuit suitable for use in the preferred embodiment of FIG. 1.

Referring now to FIGS. 2 and 3, the encoder circuit 10 includes an inverter 26 with the input thereof provided with horizontal sync pulses by the sync generator 12 (illustration a, FIG. 2). During the presence of a generated horizontal sync pulse, ground potential (referred to as ZERO hereinafter) is provided to the input of the inverter 26; during the absence of a generated horizontal sync pulse a positive voltage (typically 10 volts and referred to as ONE hereinafter) is provided. In response to a ZERO and to a ONE at its input, the inverter 26 respectively provides a ONE and a ZERO at its output. The inverter 26, typically comprised of a transistor and resistors, is a type of circuit well known to those skilled in the digital circuit art.

Generated vertical sync pulses (illustration *b*, FIG. 2) are provided to the input of an inverter 28 which is similar to the inverter 26. The duration of a generated vertical sync pulse in the illustrated embodiment spans a time interval during which three generated horizontal sync pulses occur (illustration a, FIG. 2). During the presence of a generated vertical sync pulse, ZERO is provided to the input of the inverter 26; during the absence of a generated vertical sync pulse ONE is provided thereto.

An AND gate 30, a type of circuit well known in the digital art, has a first input 32 connected to the sync generator 12 through the line 14 and a signal line 34. A second input 36 is connected to the output of the inverter 28 through a signal line 40. The gate 30 provides a ONE in response to the simultaneous absence of a generated horizontal sync pulse and the presence of a generated vertical sync pulse. The output of the gate 30 is connected to the base of a transistor 42 through a capacitor 44.

The emitter and the collector of the transistor 42 are respectively connected to a negative DC voltage source 45 (−Vc) and to a positive DC voltage source 46 (+Vc) through a resistor 50. The sources 45, 46 provide voltages having a magnitude greater than ONE, typically 15 volts. The base of the transistor 42 is connected through a resistor 48 to the source 45 (−Vc). Therefore, in the absence of a signal provided by the AND gate 30 (through the capacitor 44), the base and the emitter are at substantially the same voltage because of their connection through the resistor 48 whereby there is an absence of current from the collector to the emitter (referred to as collector current hereinafter). A ONE provided by the gate 30 is transmitted through the capacitor 44 whereby the base becomes more positive than the emitter thereby causing the conduction of collector current. When the collector current is conducted through the resistor 50, the voltage at the collector drops to substantially the voltage of the source 45 (−Vc).

The output of the inverter 28 is connected through a diode 52 to the collector of the transistor 42. The diode 52 is poled to conduct current into the output of the inverter 28. In the absence of collector current, a current is conducted from the source 46 (+Vc), through the resistor 50, through the diode 52 to the output of the inverter 28. Since the voltage dropped across a conducting diode is negligible, the cathode and anode of the diode 52 are substantially the voltage provided by the inverter 28 (ZERO or ONE). When the transistor 42 conducts collector current, the collector voltage (−Vc) reverse biases the diode 52 thereby causing the non-conduction thereof.

A unity gain output amplifier 54 has its input respectively connected through a resistor 56 to the junction of the collector of the transistor 42 and the anode of the diode 52 and through a resistor 58 to the output of the inverter 26. In this embodiment, the resistors 56, 58 are equal but may be of any suitable value in other embodiments.

The output of the amplifier 54 is connected through the lines 20 to the assemblies 18. The amplifier 54 provides monodrive voltages which comprise the monodrive pulses (illustration *c*, FIG. 2). As used herein, a monodrive voltage is an output signal which may selectively switch to any one of several predetermined levels from the normal steady state or zero level. In the described embodiment, a generated horizontal sync pulse (in the absence of a simultaneously generated vertical sync pulse) causes a positive monodrive voltage substantially equal to one-half of the ONE voltage; a generated horizontal sync pulse and a simultaneously generated vertical sync pulse causes a positive monodrive voltage substantially equal to the ONE voltage; a generated vertical sync pulse (in the absence of a simultaneously generated horizontal sync pulse) causes a negative monodrive voltage substantially equal to half of the voltage provided by the source 45. In other words, positive monodrive pulses are always indicative of a generated horizontal sync pulse and may be indicative of a generated vertical sync pulse as well; negative monodrive pulses are always indicative of a generated vertical sync pulse.

In response to a generated horizontal sync pulse and the simultaneous absence of a generated vertical sync pulse, ONE is provided to the resistor 58 at the outupt of the inverter 26; ZERO is provided through the diode 52 to the resistor 56 by the output of the inverter 28. Since a voltage divider is formed by the resistors 56, 58, at the junction thereof a positive voltage equal to one-half of the ONE voltage is provided to the input to the amplifier 54 thereby causing a monodrive voltage equal to one-half of the ONE voltage.

A generated vertical sync pulse (in the absence of a generated horizontal sync pulse) results in the ZERO at the output of the inverter 26 and causes a collector voltage of the transistor 42 being equal to the voltage of the source 45 (−Vc). In response thereto the voltage divider causes a negative monodrive voltage substantially equal to one-half of the voltage of the source 45 (−Vc).

The simultaneous provision of generated horizontal and vertical sync pulses causes ONE at the outputs of the inverters 26, 28. In response thereto the voltage divider causes a positive monodrive voltage equal to the ONE voltage.

Figure 4:
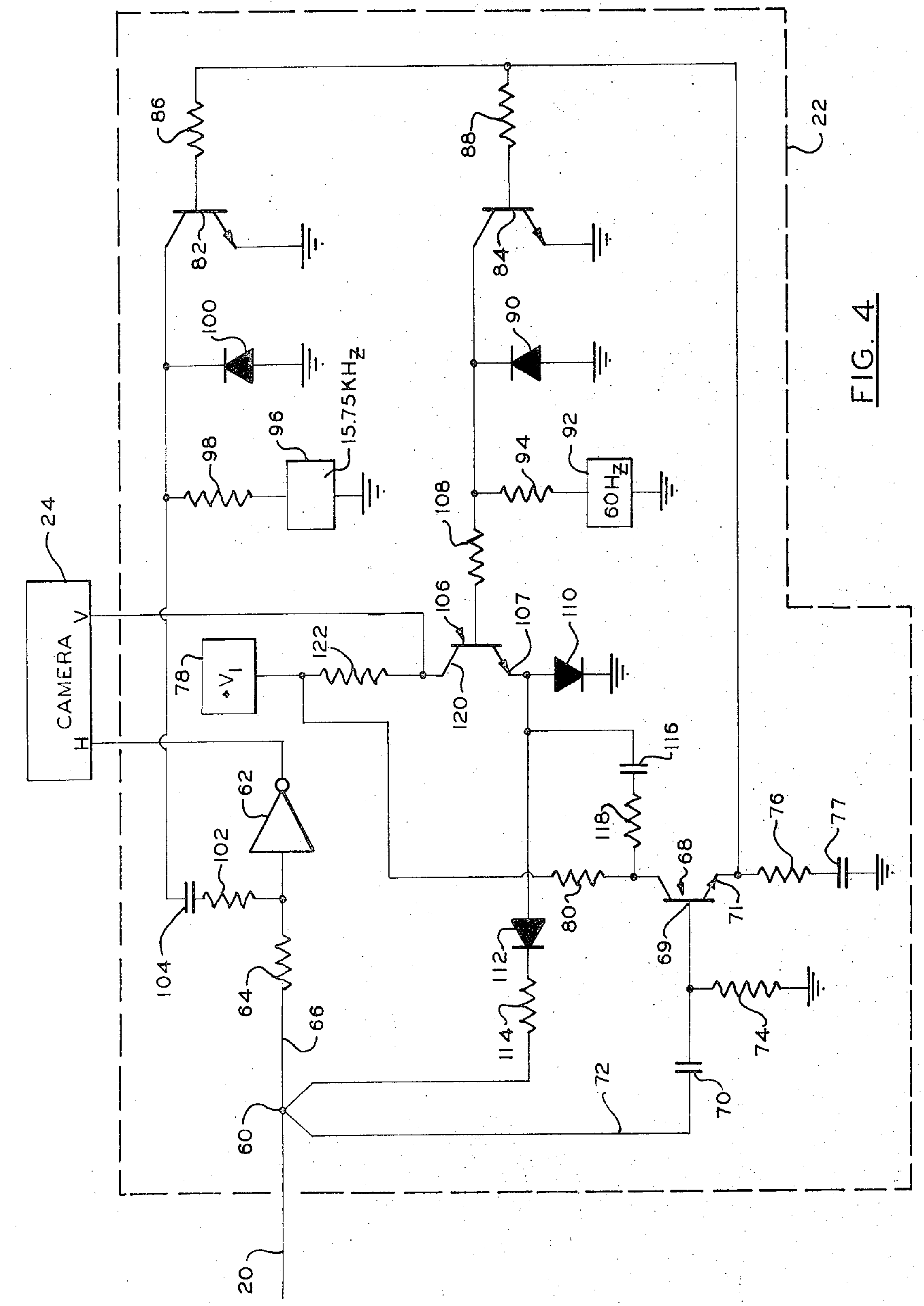
FIG. 4 is a schematic diagram of a decoder circuit suitable for use in the preferred embodiment of FIG. 1.

Referring now to FIG. 4, the decoder 22 receives the monodrive pulses at input terminal 60 from to the output of the amplifier 54 (FIG. 3) through the line 20. The terminal 60 is connected to the input of an inverter 62 through a resistor 64 via a signal line 66. The output of the inverter 62 is connected to a horizontal sync input (H) of the camera 24. The inverter 62 provides ZERO and ONE in response to a positive and a negative monodrive pulse, respectively. Since positive monodrive pulses are indicative of a generated horizontal sync pulse, in response thereto the inverter 62 provides horizontal sync pulses synchronized with the generator 12 (FIG. 1).

The terminal 60 is connected to a transistor 68 at the base 69 thereof through a capacitor 70 via a signal line 72 whereby monodrive pulses are applied at the base 69. The base 69 and the emitter 71 of the transistor 68 are respectively connected to ground through a resistor 74 and a resistor 76 in series with a capacitor 77. The collector of the transistor 68 is connected to a source of a positive operating voltage 78 ($+V_1$), equal to the ONE voltage, through a resistor 80. When a positive monodrive pulse is applied at the base 69, the voltage at the emitter 71 is substantially the same as the applied voltage (unless the capacitor 77 is charged to a voltage more positive than the applied voltage). The capacitor 77 is charged by the voltage provided to the emitter 71 in response to the monodrive pulses. Because the capacitor 77 is in series with the resistor 76, the rate of charging is in accordance with a time constant associated with the product of the values of the resistor 76 and the capacitor 77. The relatively infrequent occurrence of the vertical sync signal (60 Hz rate) which in the illustration of FIG. 2 is three monodrive pulses equal to the ONE voltage causes only a small change of the voltage on the capacitor 77. In this embodiment therefore, the voltage on the capacitor 77 is substantially equal to the amplitude of a monodrive pulse equal to one-half the ONE voltage caused by the presence of a generated horizontal sync pulse and the absence of a generated vertical sync pulse (which horizontal pulse occurs at the 15.75 KHz rate).

During the absence of the monodrive pulses, ground potential is provided through the resistor 74 to the base 69 whereby the base to emitter junction of the transistor 68 is reverse biased. It should be understood that in some embodiments the resistor 76 may be provided as an inherent characteristic of the transistor 68 whereby the emitter 71 may be connected directly to the capacitor 77. The voltage on the capacitor 77 causes base currents to flow in transistors 82, 84 through resistors 86, 88, respectively thereby reducing the voltage on the capacitor 77.

The collector of the transistor 84 is connected to ground through a diode 90 and to a 60 Hz voltage source 92 through a resistor 94. The diode 90 is poled to conduct current from ground to the collector of the transistor 84. When the positive portion of a voltage cycle is provided by the source 92, current through the resistor 94 is conducted through the transistor 84 to ground. The collector of the transistor 84 is saturated by the current into the base thereof whereby the collector thereof is substantially at ground potential. When the negative portion of a cycle from the source 92 is provided through resistor 94, the diode 90 conducts current through the resistor 94; since the voltage dropped across a conducting diode is negligible, ground potential is substantially maintained at the collector of the transistor 84. Therefore, the saturation of the transistor 84 causes a current at a frequency of 60 Hz to flow through the resistor 94 while the collector of the transistor 84 is at substantially ground potential. In a similar manner, the transistor 82, a 15.75 KHz voltage source 96, a resistor 98 and a diode 100 combine to provide a source of 15.75 KHz current through the resistor 98 and maintain ground potential at the collector of the transistor 82.

The collector of the transistor 82 is connected to the input of the inverter 62 through a resistor 102 and a capacitor 104 connected in series. When the collector of the transistor 82 remains at substantially ground potential, a signal current is not provided to the inverter 62 through the resistor 102 and the capacitor 104.

The collector of the transistor 84 is connected to a transistor 106 at the base thereof through a resistor 108. When the collector of the transistor 84 remains substantially at ground potential, a signal current is not provided through the resistor 108 and the transistor 106 is only responsive to input currents conducted from the emitter 107 thereof.

The emitter 107 is connected to ground through a diode 110, to the terminal 60 through a diode 112 in series with a resistor 114 and to the collector of the transistor 68 through a capacitor 116 in series with a resistor 118. The collector 120 of the transistor 106 is connected to the source 78 through a resistor 122. The diode 112 is poled to conduct a first vertical monodrive current from the emitter 107 to the terminal 60 and the diode 110 is poled to conduct current from the emitter 107 to ground; the diode 110 prevents the voltage of the emitter 107 from being substantially above ground potential and conducts current from the transistor 106 when unsynchronized sync pulses are provided to the camera 24, as described hereinafter. A negative monodrive pulse (associated with a generated vertical sync pulse) causes the conduction of a first vertical monodrive current from the emitter 107 through the diode 112 and through the resistor 114 to the terminal 60. The first vertical monodrive current from the emitter causes a substantially equal current flow from the source 78 to the collector 120 whereby substantially ground potential is provided thereat. A positive monodrive pulse caused by simultaneously generated horizontal and vertical sync pulses causes the conduction of a second vertical monodrive current from the emitter 107 through the capacitor 116 and the resistor 118 through the transistor 68. The second vertical monodrive current provides part of the charge for the capacitor 77 (the remainder being provided by current from the source 78 through the resistor 80) and causes the collector 120 to provide substantially ground potential during the presence of any of the three monodrive pulses which occur during the vertical sync pulses. Therefore, the collector 120 provides ground potential whenever a negative monodrive pulse is provided or when any of the three positive monodrive pulses occur during the presence of a vertical sync pulse. Accordingly in response to the presence of a generated vertical sync pulse, the collector 120 provides ground potential (ZERO); in response to the absence of a generated vertical sync pulse the collector 120 provides the voltage of the source 78 (ONE). Therefore, the collector 120 provides vertical sync pulses synchronized with the generator 12 and is accordingly connected to the vertical sync input (V) of the camera 24.

In the absence of monodrive pulses, the capacitor 77 discharges through the resistors 76, 86, 88 and the transistors 82, 84. After the discharge, the base currents no longer flow in the transistors 82, 84 and positive portions of the currents provided through the resistors 94, 98 (by the sources 92, 96) respectively provide signal currents to the inputs of the inverter 62 and to the base of the trnasistor 106. The inverter 62, therefore, provides unsynchronized horizontal sync pulses at the frequency of the source 94 (15.75 KHz). In response to the signal current in the base (provided at a frequency at 60 Hz), a collector current (also at a frequency of 60 Hz) is conducted through the transistor 106 and through the diode 110 to ground. The transistor 106, therefore, provides unsynchronized vertical sync pulses at the frequency of source 92. Although the sources 92, 96 may not provide the pulse widths of the synchronized sync pulses, the camera 24 is only responsive to positive (or negative) transitions of sync pulse provided by the inverter 62 and the transistor 106.

Thus there has been shown apparatus for disjunctively providing horizontal and vertical sync pulses synchronized with central sync generator to a plurality of TV cameras. In the absence of monodrive pulses, unsynchronized sync pulses are provided to the camera.

Having thus described a typical embodiment in my invention, that which I claim as new and desire to secure by Letters Patent of the United States is:

1. A system for providing horizontal and vertical sync signals to TV apparatus from a sync generator on a single conductor of an interconnecting cable comprising:

a first signal generator for generating a first pair of pulse trains suitable for providing horizontal and vertical synchronization to TV apparatus;

en encoder connected to said signal generator and responsive to said first pair of pulse trains for providing an output signal which selectably switches between four amplitude levels to generate a series of pulses having the same repetition rate as one pulse train of said pair of pulse trains, the first amplitude level occurring only when pulses from both pulse trains are simultaneously absent, the second amplitude level occurring only when a pulse from the first pulse train of said first pair of pulse trains is present and a pulse from the second pulse train of said first pair of pulse trains is absent, said third amplitude level occurring only when a pulse from both pulse trains of said first pair are simultaneously present, said fourth amplitude level occurring only when a pulse from said second pulse train of said first pair is present and a pulse from said first pulse train of said first pair is absent; and a decoder connected to said encoder and responsive to said output signal for generating a second pair of pulse trains synchronized with said first pair of pulse trains to provide horizontal and vertical synchronization to TV apparatus connected thereto, pulses in one pulse train of said second pair of pulse trains being generated only in response to those pulses of said series of pulses having either said second or third amplitude levels and pulses in the other pulse train of said second pair of pulse trains being generated only in response to those pulses of said series of pulses having either said third or fourth amplitude levels.

2. Apparatus according to claim 1 wherein said decoder further comprises:

a second signal generator for generating a third pair of pulse trains suitable for providing horizontal and vertical synchronization to said TV apparatus; and circuitry for connecting said third pair of pulse trains to said TV apparatus in the absence of said series of pulses being generated.

3. Apparatus according to claim 1 wherein said one pulse train of said second pair of pulse trains provides horizontal synchronization to said TV apparatus and is synchronized with said first pulse train of said first pair of pulse trains, and said other pulse train of said second pair of pulse trains provides vertical synchronization to said TV apparatus and is synchronized with said second pulse train of said first pair of pulse trains.

4. Apparatus according to claim 2 wherein said circuitry comprises:

a capacitor which charges to a voltage greater than a known voltage in response to said monodrive pulses; and means connected to said capacitor for providing said unsynchronized sync pulses in response to said capacitor discharging to a voltage less than said known voltage.

* * * * *